United States Patent [19]

Fu

[11] Patent Number: 5,513,733
[45] Date of Patent: May 7, 1996

[54] BICYCLE HUB UNIT WITH BEARING-RECEIVERS FOR MOUNTING A CYLINDER DRIVE IN A HUB SHELL THEREOF

[76] Inventor: Chueh-Kuo Fu, No. 74, Ssu-Yueh Rd., Tai-Ping Tsun, Hou-Li Hsiang, Taichung Hsien, Taiwan

[21] Appl. No.: 309,120

[22] Filed: Sep. 20, 1994

[51] Int. Cl.⁶ ................................................. F16D 41/24
[52] U.S. Cl. ................................................................. 192/64
[58] Field of Search ...................................... 192/64, 110 B

[56] References Cited

U.S. PATENT DOCUMENTS

| 2,211,548 | 8/1940 | Schwinn | 192/64 |
| 2,394,112 | 2/1946 | Schwinn | 192/64 |

FOREIGN PATENT DOCUMENTS

| 847131 | 10/1939 | France | 192/64 |

*Primary Examiner*—Rodney H. Bonck
*Attorney, Agent, or Firm*—Ladas & Parry

[57] ABSTRACT

A bicycle hub shell has an axial bore with a first end portion, a second end portion and an internal wall which confines the axial bore into a first section adjacent to the first end portion and a second section adjacent to the second end portion and narrower than the first section. A first bearing-receiver is disposed in the first end portion of the hub shell and has an enlarged head to receive a bearing therein and an internally threaded connecting tube which extends into the first section. A cylinder drive has a head portion disposed partially in the second end portion of the axial bore, an externally threaded end portion which is spaced axially from the head portion, and a plurality of ratchet pawls exposed exteriorly from the second end portion of the axial bore. The head portion of the cylinder drive further has an externally threaded and axially extending tube extension projecting into the first section of the axial bore and engaging the connecting tube of the first bearing-receiver. A sprocket carrier is supported around and engages the ratchet pawls of the same so that the cylinder drive is co-rotatable with the hub shell.

4 Claims, 5 Drawing Sheets

5,513,733

BICYCLE HUB UNIT WITH BEARING-RECEIVERS FOR MOUNTING A CYLINDER DRIVE IN A HUB SHELL THEREOF

BACKGROUND OF THE INVENTION

1. Field of the Invention

This invention relates to a bicycle hub unit, more particularly to a bicycle hub unit with bearing-receivers for mounting a cylinder drive in a hub shell thereof.

2. Description of the Relative Art

Referring to FIGS. 1 and 2, a conventional bicycle hub unit which is to be attached to a rear wheel of a bicycle is shown to comprise a hub shell 1 which has an axial bore 11 with a first axial end portion and a second axial end portion opposite to the first axial end portion. The hub shell 1 is supported rotatably on a hub shaft (not shown) that is mounted securely on the axle of the rear wheel of the bicycle. The hub shell 1 further has an annular series of external splines 12 which are formed at an outer end surface of the second axial end portion of the axial bore 11, and an annular shoulder 13 (see FIG. 2) which is formed on an inner peripheral surface of the hub shell 1 near the first axial end portion of the axial bore 11. A bolt 2 extends through the axial bore 11 of the hub shell 1 and is sleeved on the hub shaft. The bolt 2 has an externally threaded end portion 21 which extends out of the second axial end portion of the axial bore 11, and a head portion 22 which bears against the shoulder 13. A first bearing 3 is disposed within the first axial end portion of the axial bore 11. A cylinder drive 5 includes a head portion which is sleeved on the external splines 12 of the hub shell 1 and which has an annular series of internal splines 51 (see FIG. 2) meshing with the external splines 12 of the hub shell 1. Accordingly, when assembled, the hub shell 1 is co-rotatable with the cylinder drive 5. The cylinder drive 5 further includes an externally threaded end portion 52, two pair of ratchet pawls 53 mounted on an outer circumference of the same, and an internally threaded portion 54 connected threadedly to the externally threaded end portion 21 of the bolt 2 so as to fix the cylinder drive 5 to the hub shell 1. A sprocket carrier 6 is supported around the cylinder drive 5 and has an annular series of ratchet teeth 61 formed on an inner circumference thereof.

A waterproofing ring 4 is disposed on one end of the sprocket carrier 6 around the second axial end portion of the axial bore 11 and abuts against the hub shell 1.

The ratchet pawls 53 are spring-loaded and engage operably the ratchet teeth 61 such that the sprocket carrier 6 is co-rotatable with the cylinder drive 5 in a forward running direction for torque transmission, and is freely rotatable relative to the cylinder drive 5 in the opposite direction to enable inertial running of the bicycle. Thus, the sprocket carrier 6 can rotate relative to the cylinder drive 5 only in one direction.

A second bearing 7 is disposed within the sprocket carrier 6 and has an internally threaded portion 71 which is connected threadedly to the externally threaded end portion 52 of the cylinder drive 5.

A plurality of diametrically different sprockets 8, as shown in FIG. 3, are supported on the sprocket carrier 6 for co-rotation therewith.

Note that the connecting positions of the cylinder drive 5 to the locking bolt 2 and the second bearing 7 are located outside of the second axial end portion of the axial bore 11 of the hub shell 1. When the conventional bicycle hub unit is in use, force is applied on the sprocket carrier 6 and is then transferred to the connecting positions. Concentration of the applied force at only one side of the hub shell 1 shortens the service life of the conventional hub unit.

SUMMARY OF THE INVENTION

The objective of this invention is to provide a bicycle hub unit, wherein a force received thereby is distributed on both sides thereof to lengthen the service life of the hub unit.

More specifically, the objective of this invention is to provide a bicycle hub unit which includes bearing-receivers and a cylinder drive, the connecting positions of which are partly located inside the hub shell such that a received force which is transferred via the sprocket carrier and the cylinder drive is shared by the bearing-receivers to lengthen the service life of the bicycle hub shell.

According to the present invention, a bicycle hub unit includes: a hub shell which has an axial bore with a first axial end portion and a second axial end portion opposite to the first axial end portion; a first bearing mounted in the first axial end portion; a cylinder drive with an externally threaded end portion, a head portion which is spaced axially from the threaded end portion, and a plurality of ratchet pawls mounted on an outer circumferential surface between the head portion and the threaded end portion and secured partially in the second axial end portion of the axial bore, the ratchet pawls and the threaded end portion being disposed exteriorly from the second axial end portion; a sprocket carrier which is supported around a partial of the head portion, the ratchet pawls and the threaded end portion of the cylinder drive and which engages the ratchet pawls for rotation in only one direction; and a second bearing disposed within the sprocket carrier. The axial bore of the hub shell is defined by an internal wall and is divided into a first section adjacent to the first axial end portion, and a second section adjacent to the second axial end portion and is narrower than the first section. A first bearing-receiver is disposed in the first axial end portion of the axial bore and has an enlarged head which receives the first bearing therein, and an internally threaded connecting tube which extends into the first section of the axial bore. A second bearing-receiver is disposed in the sprocket carrier and receives the second bearing therein. The second bearing-receiver has an internally threaded portion which engages the externally threaded end portion of the cylinder drive. The head portion of the cylinder drive further has an externally threaded and axially extending tube extension which projects into the first section of the axial bore and which engages the internally threaded connecting tube of the first bearing-receiver.

In the disclosed embodiment, the hub shell has an annular shoulder formed between the first and second sections of the axial bore. The connecting tube of the first bearing-receiver has a length and an external diameter which are substantially equal to a length and an inner diameter of the first section of the axial bore of the hub shell, and an abutting end face which abuts against the annular shoulder. The tube extension of the cylinder drive preferably has a length which is greater than a length of the second section of the axial bore and an external diameter which is substantially equal to an inner diameter of the latter. The hub shell further has an annular series of internal splines formed in the second axial end portion of the axial bore and the head portion of the cylinder drive further has an annular series of external splines which mesh with the internal splines of the second axial end portion of the hub shell.

In the hub unit of the present invention, the connection positions among the cylinder drive and the bearing-receivers are located on both sides of the hub shell so that a force received via the sprocket carrier at one side of the hub shell is shared by the bearing-receivers through the cylinder drive, thereby lengthening the service life of the bicycle hub unit of the present invention.

BRIEF DESCRIPTION OF THE DRAWINGS

Other features and advantages of the present invention will become more apparent in the following detailed description of a preferred embodiment of this invention, with reference to the accompanying drawings, in which.

DETAILED DESCRIPTION OF THE PREFERRED EMBODIMENT

Figure 1:
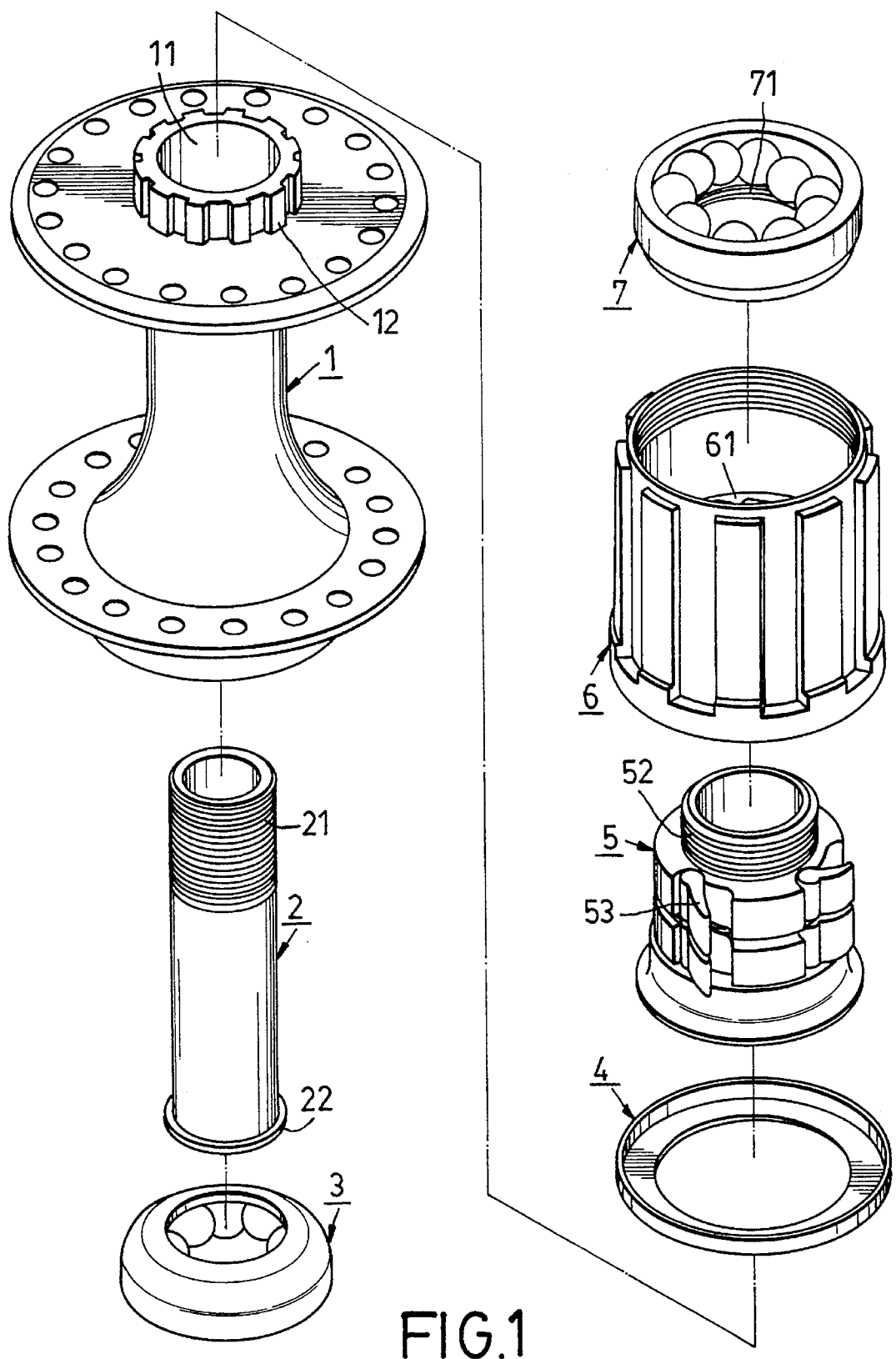
FIG. 1 is an exploded view of a conventional bicycle hub unit.
Figure 2:
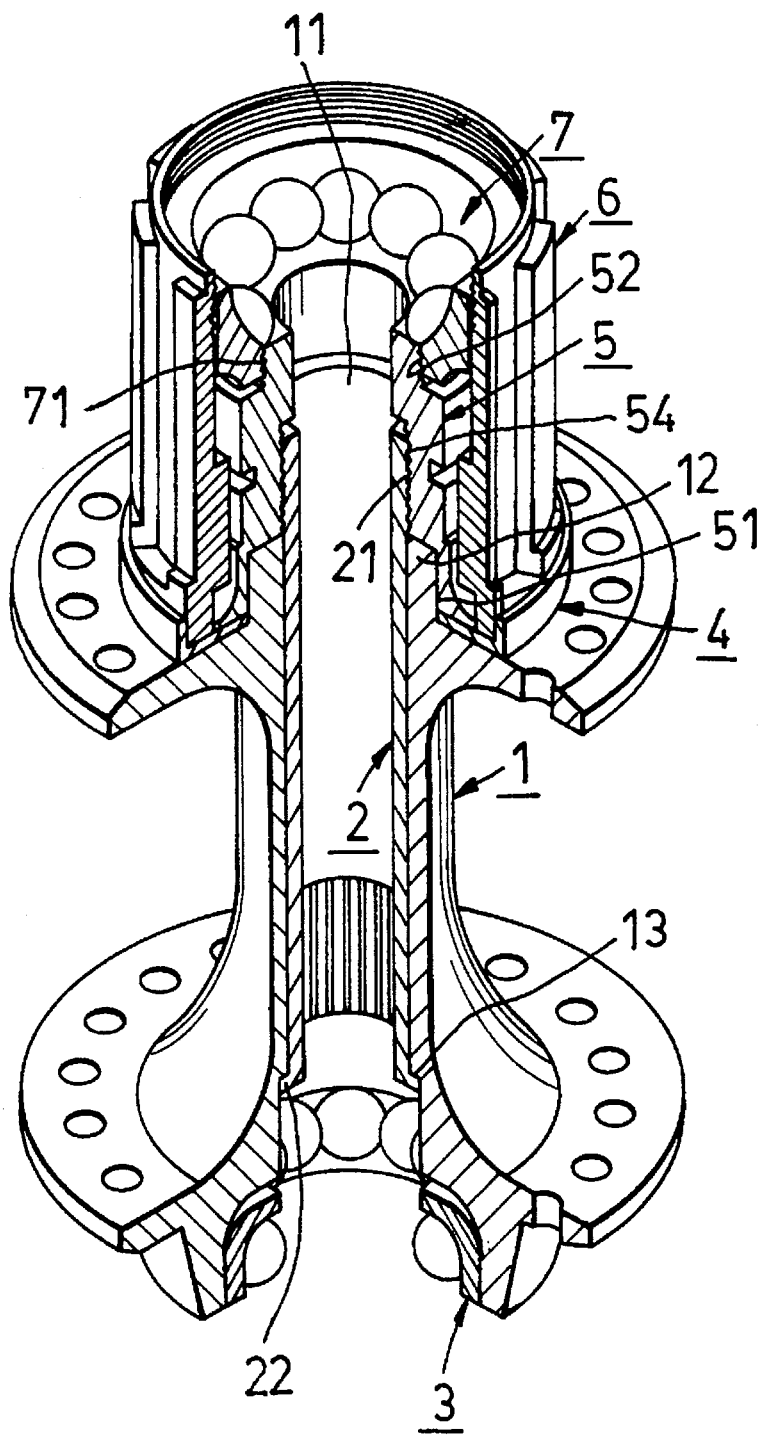
FIG. 2 is a partly sectional perspective view showing the conventional bicycle hub unit.
Figure 3:
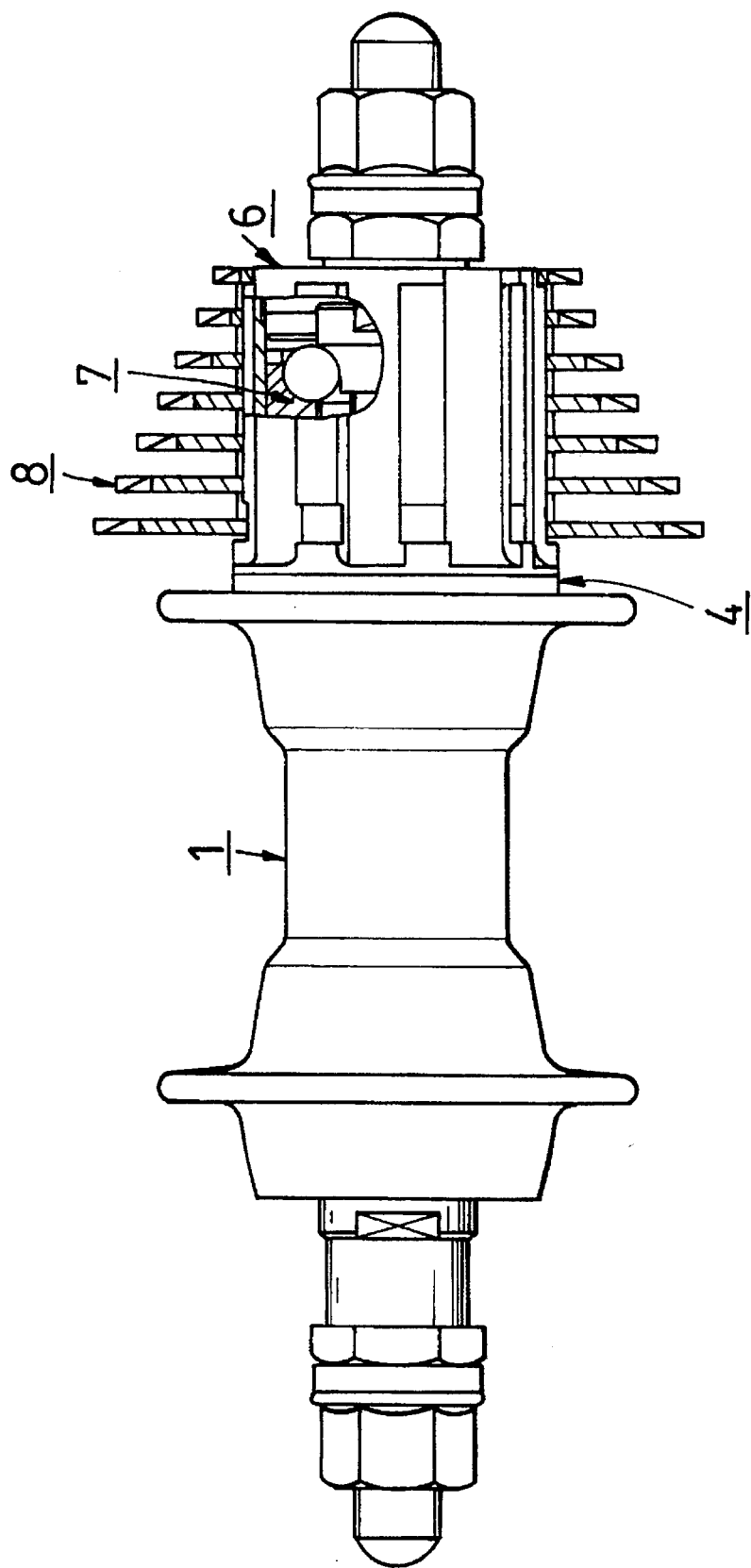
FIG. 3 is a schematic view illustrating a plurality of diametrically different sprockets supported on the sprocket carrier of the conventional hub unit.
Figure 4:
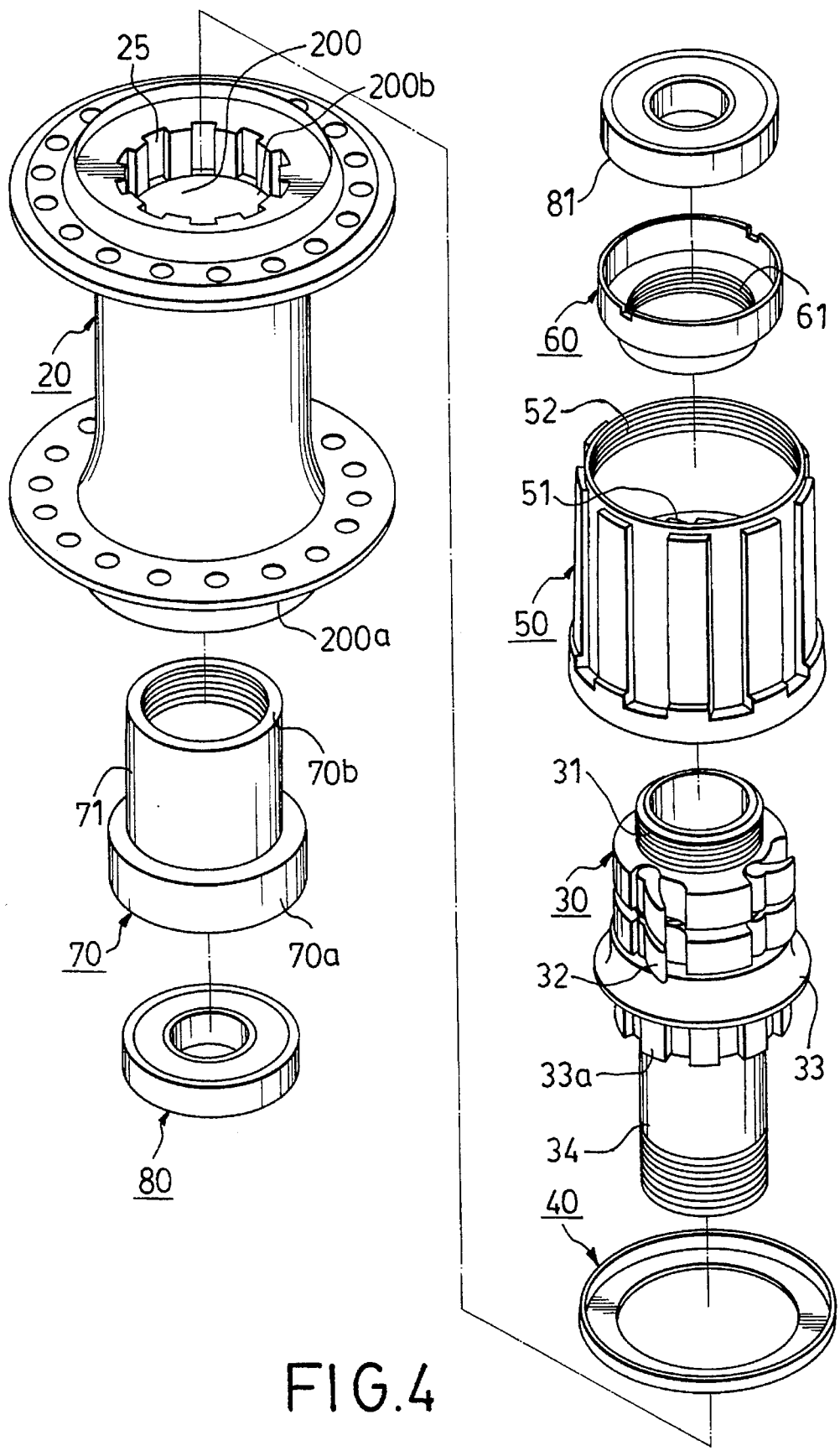
FIG. 4 is an exploded view of a bicycle hub unit of the present invention.
Figure 5:
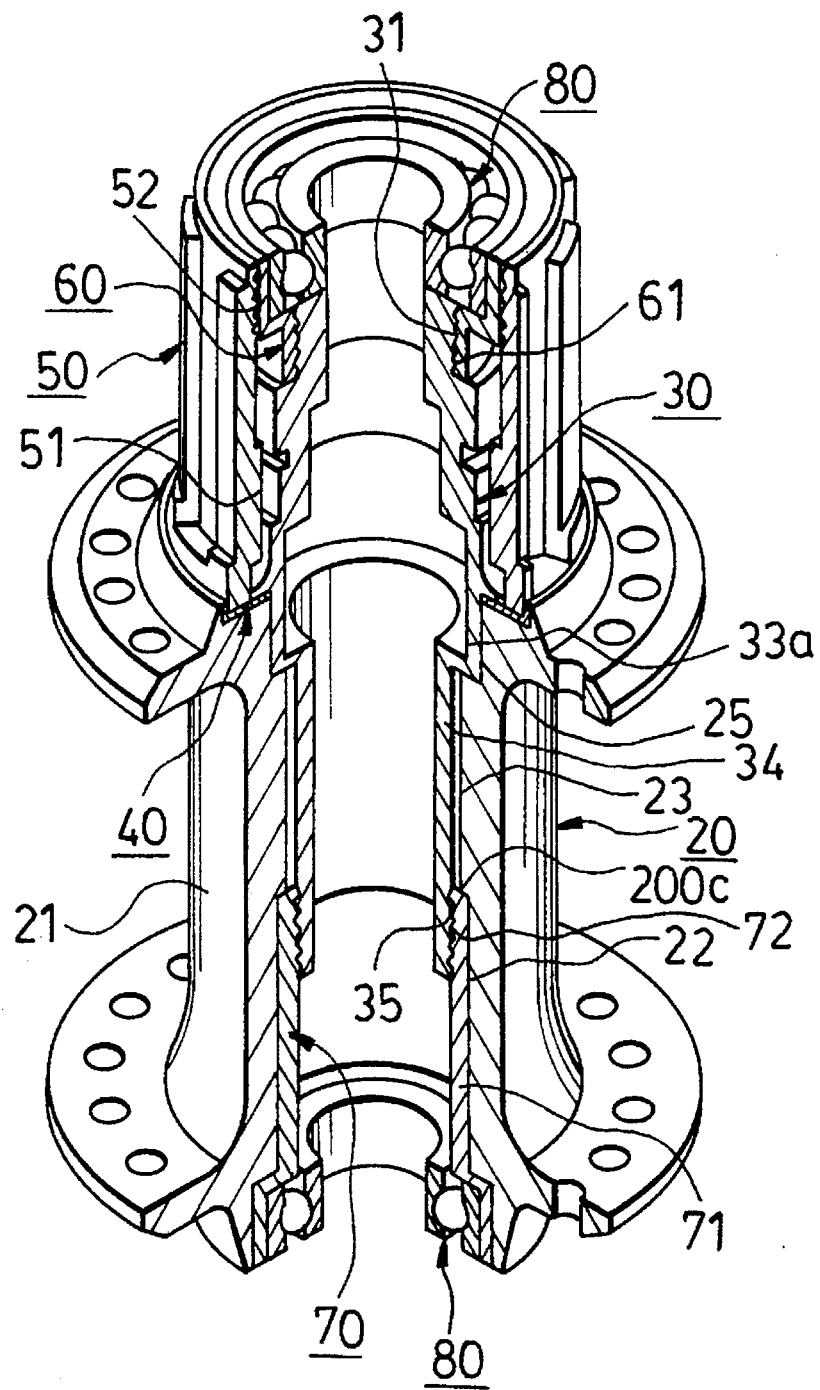
FIG. 5 is a partly sectional perspective view showing the bicycle hub unit according to this invention.

Referring to FIGS. 4 and 5, a bicycle hub unit of the preferred embodiment of this invention is to be attached to the rear wheel of a bicycle and includes a hub shell 20, a first bearing-receiver 70, a pair of bearings 80, 81, a waterproofing ring 40, a cylinder drive 30, a sprocket carrier 50, and a second bearing-receiver 60.

The hub shell 20 has an axial bore 200 with a first axial end portion 200a and a second axial end portion 200b opposite to the first axial end portion 200a. The hub shell 20 has an internal wall which defines the axial bore 200. The axial bore 200 is divided into a first section 22 adjacent to the first axial end portion 200a and a second section 23 adjacent to the second axial end portion 200b and narrower than the first section 22 so that an annular shoulder 200c is formed between the first and second sections 22, 23. The hub shell 20 further has an annular series of internal splines 25 formed in the second axial end portion 200b.

The first bearing-receiver 70 has an enlarged head 70a and an internally threaded connecting tube 71 with an abutting end face 70b. The first bearing-receiver 70 is inserted into the axial bore 200 of the hub shell 20 from the first axial end portion 200a and is provided around the hub shaft (not shown) such that the enlarged head 70a receives the first bearing 80 therein. The abutting end face 70b of the connecting tube 71 extends into the first section 22 of the axial bore 200 and abuts against the annular shoulder 200c.

The cylinder drive 30 has an externally threaded end portion 31, a head portion 33 which is spaced axially from the threaded end portion 31, and a plurality of ratchet pawls 32 formed on an outer circumferential surface between the threaded end portion 31 and the head portion 33. The head portion 31 of the cylinder drive 30 is further provided with an annular series of external splines 33a and an externally threaded and axially extending tube extension 34. The cylinder drive 30 is provided in the axial bore 200 of the hub shell 20 at the second end portion 200b. The external splines 33a engage the internal splines 25 of the hub shell 20 so that the head portion 33, the ratchet pawls 32 and the threaded end portion 31 of the cylinder drive 30 are exposed exteriorly from the axial bore 200 of the hub shell 20. Under such a condition, the tube extension 34 of the cylinder drive 30 extends via the second section 23 of the hub shell 20 and engages the internally threaded connecting tube 71 of the first bearing-receiver 70, thereby securing the cylinder drive 30 to the hub shell 20 to permit the latter to rotate synchronously with the former.

The sprocket carrier 50 is supported around an enlarged portion of the head portion 33, the ratchet pawls 32 and the threaded end portion 31 of the cylinder drive 30 and has an annular series of ratchet teeth 51 formed on an inner circumference thereof.

A plurality of diametrically different sprockets (not shown) are supported on the sprocket carrier 50 for co-rotation therewith.

The ratchet pawls 32 of the cylinder drive 30 are spring-loaded and engage operably the ratchet teeth 51 of the sprocket carrier 50 such that the sprocket carrier 50 is co-rotatable with the cylinder drive 30 in a forward running direction for torque transmission, and is freely rotatable relative to the cylinder drive 30 in an opposite direction to enable inertial running of the bicycle.

A second bearing-receiver 60 is disposed within the sprocket carrier 50 and has an internally threaded portion 61 which is connected threadedly to the externally threaded end portion 31 of the cylinder drive 30. A bearing 81 is received in the second bearing-receiver 60 for journalling one end portion of the hub shaft (not shown) therein.

Referring to FIG. 5, the waterproofing ring 40 is disposed on one end of the sprocket carrier 50 around the second axial end portion 200b of the axial bore 200 and abuts against the hub shell 20.

Note that in the preferred embodiment of this invention, the connecting positions between the first bearing-receiver 70 and the tube extension 34 of the cylinder drive 30, and between the external splines 33a of the cylinder drive 30 and the internal splines 25 of the hub shell 20 are located inside the axial bore 200 of the hub shell 20. Accordingly, when the bicycle hub unit is in use, a received force which is transferred via the sprocket carrier 50 and the cylinder drive 30 is shared by the bearing-receivers 60, 70 on both sides of the hub shell 20. Thus, the hub unit of the present invention is prevented from being easily ruined.

In order to prevent the cylinder drive 30 from wobbling relative to the hub shell 20, the connecting tube 71 of the first bearing-receiver 70 preferably has a length and an external diameter substantially equal to a length and an inner diameter of the first section 22 of the axial bore 200, while the tube extension 34 of the cylinder drive 30 preferably has a length longer than the second section 23 of the axial bore 200 and an external diameter smaller than but approximately equal to an inner diameter of the second section 23. Thus, the connecting tube 71 of the first bearing-receiver 70 and the tube extension 34 of the cylinder drive 30 are in tight contact with inner surfaces of the first and second sections of the hub shell 20 to prevent wobbling.

With the present invention thus explained, it is apparent that numerous modifications and variations can be made without departing from the scope and spirit of this invention. It is therefore intended that this invention be limited only as indicated in the appended claims.

I claim:

1. A bicycle hub unit including: a hub shell having an axial bore with a first axial end portion and a second axial end portion opposite to said first axial end portion; a first bearing mounted in said first axial end portion; a cylinder drive having an externally threaded end portion, a head portion which is spacedly axially from said threaded end portion, and a plurality of ratchet pawls mounted on an outer circumferential surface between said head portion and said threaded end portion, said head portion of said cylinder drive being secured partially in said second axial end portion of said axial bore, said ratchet pawls and said threaded end portion being disposed exteriorly from said second axial end portion, a sprocket carrier supported around an enlarged portion of said head portion, said ratchet pawls and said threaded end portion and engaging said ratchet pawls for rotation in only one direction; and a second bearing disposed within said sprocket carrier;

wherein the improvement comprises:

said axial bore of said hub shell being defined by an internal wall which is divided into a first section adjacent to said first axial end portion, and a second section adjacent to said second axial end portion and narrower than said first section, thereby forming an annular shoulder between said first and second sections;

a first bearing-receiver disposed in said first axial end portion of said axial bore and having an enlarged head receiving said first bearing therein and an internally threaded connecting tube extending into said first section of said axial bore;

a second bearing-receiver disposed in said sprocket carrier, said second bearing-receiver receiving said second bearing therein and having an internally threaded portion engaging said externally threaded end portion of said cylinder drive; and said head portion of said cylinder drive further having an externally threaded and axially extending tube extension projecting into said first section of said axial bore and engaging said internally threaded connecting tube of said first bearing-receiver, thereby securing said cylinder drive on said hub shell.

2. The bicycle hub unit as defined in claim 1, wherein said connecting tube of said first bearing-receiver has a length and an external diameter which are substantially equal to a length and an inner diameter of said first section of said axial bore, and an abutting end face abutting against said annular shoulder.

3. The bicycle hub unit as defined in claim 1, wherein said tube extension of said cylinder drive has a length which is greater than a length of said second section of said axial bore and an external diameter which is smaller than but approximately equal to an inner diameter of said second section.

4. The bicycle hub unit as defined in claim 1, wherein said hub shell has an annular series of internal splines formed in said second axial end portion of said axial bore, said head portion of said cylinder drive further having an annular series of external splines which mesh with said internal splines of said second axial end portion of said hub shell.

* * * * *